UNITED STATES PATENT OFFICE.

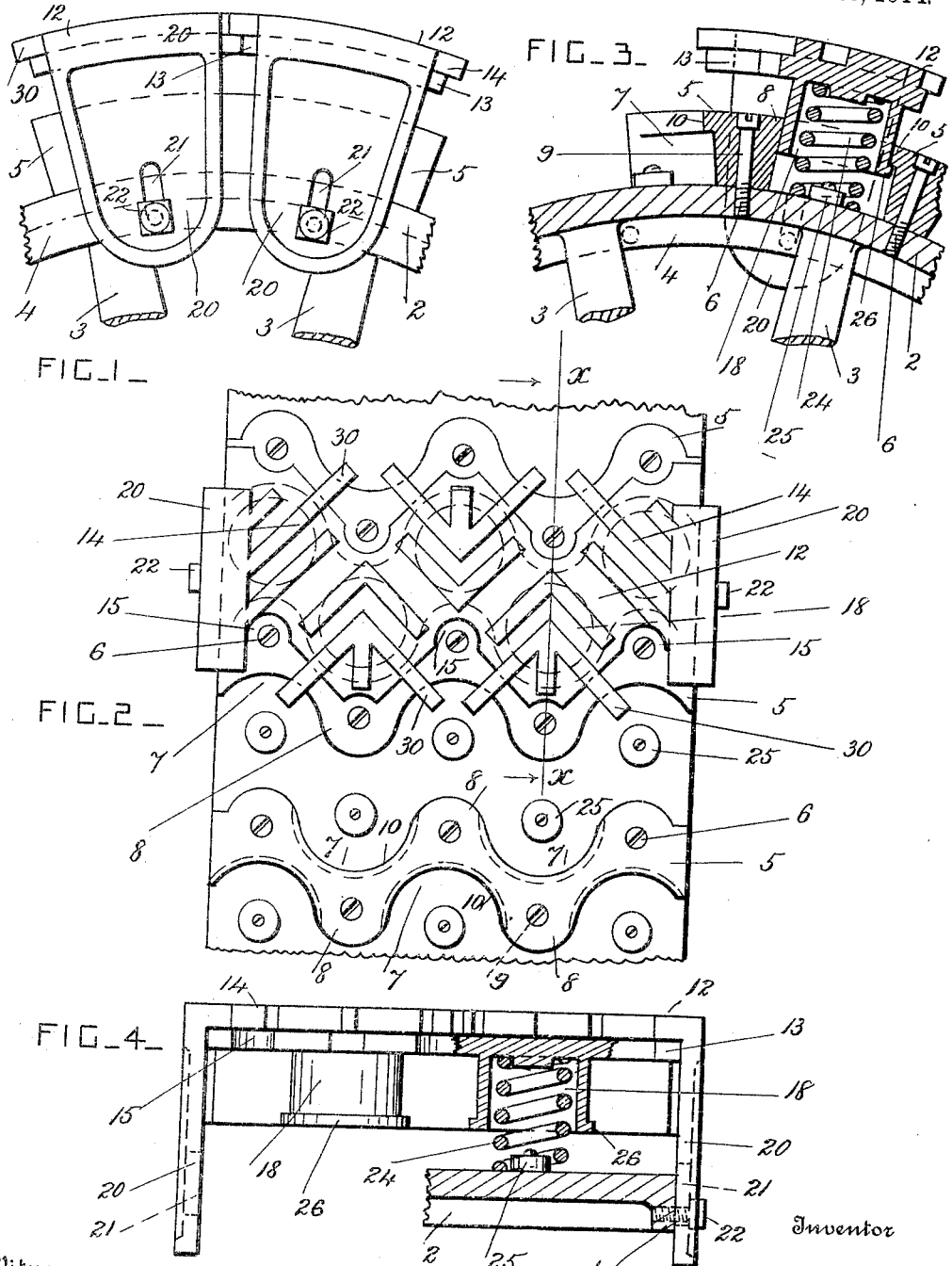

NEWTON SHAVER, OF CLEVELAND, OHIO.

TRACTION-WHEEL.

1,116,503.  Specification of Letters Patent.  Patented Nov. 10, 1914.

Application filed March 11, 1914. Serial No. 823,973.

*To all whom it may concern:*

Be it known that I, NEWTON SHAVER, a citizen of the United States, residing at Cleveland, in the county of Cuyahoga and State of Ohio, have invented certain new and useful Improvements in Traction-Wheels; and I do hereby declare the following to be a full, clear, and exact description of the invention, such as will enable others skilled in the art to which it appertains to make and use the same.

This invention relates to traction wheels for use on roads; and it consists in the novel construction and combination of the parts hereinafter fully described and claimed whereby contact with the road is effected by spring supported tire sections.

In the drawings, Figure 1 is a side view of a portion of a traction wheel constructed according to this invention. Fig. 2 is a plan view of the same but shown as if spread out flat and with one of the tire sections removed. Fig. 3 is a section of the parts as shown in Fig. 1, but taken in section on the line $x$—$x$ in Fig. 2. Fig. 4 is an end view of a tire section, showing a portion of the wheel rim and one of the spring chambers in section.

The wheel rim 2 is a cylinder of suitable size provided with spokes 3 arranged in any approved way and having inwardly projecting circumferential flanges 4 at its edges. Guide blocks 5 are secured around the periphery of the rim by screws or bolts 6. These blocks have a series of socket sections 7 and a series of projections 8 on each side, the socket sections being formed between the projections, and the socket sections on one side of the block being arranged circumferentially in line with the projections on the other side of the block. The fastening screws or bolts engage with holes 9 formed radially through the projections 8. The socket sections are preferably portions of cylinders and they have inwardly projecting lips 10 at their top edges which form stops.

The tire of the wheel is constructed of a series of tire sections 12, each formed of a plate 13 which is curved to correspond with the rim, and is provided with projections 14 for engaging with the ground. The projections 14 are preferably angle-shaped as shown, but the tire sections may have any approved projections, serrations or corrugations for engaging with the ground, or these parts may be omitted altogether, if desired. The tire sections have notches or slots 15 in their edges to give access to the fastening screws 6, and the plates 13 are formed zig-zag in shape and are arranged so that the projections on the edges of each plate fit very loosely in the recesses of the adjacent plates.

Cylindrical spring chambers 18 are formed on the underside of each tire plate 13, and are arranged in staggered relation to correspond with the zig-zag form of the plate and the staggered arrangement of the sockets formed by the guide blocks 5. The spring chambers are formed integral with each other and with the tire plate, and the projections 8 on the guide blocks are arranged in the spaces between the spring chambers. The ends of each tire section have plates 20 which overlap the edges of the rim and which are provided with radial guide-slots 21. Bolts 22 pass through holes in the rim flanges 4, and the slots 21 are slidable over the bolts 22 and limit the radial movements of the tire sections and guide them so that they slide freely. Helical springs 24 are arranged in the spring chambers between the tire plates and the wheel rim, and disks 25 are secured to the wheel rim on the axes of the springs in order to hold their inner end coils in position. The spring chambers have outwardly projecting lips 26 at their bottom edges which form stops for engaging with the stops 10 on the spring chambers. The tire sections are normally forced outwardly by the springs so that the stops 26 and 10 are in contact. As the wheel runs on the road the tire sections are pressed inwardly against the pressure of the helical springs, so that the jolts and jars due to roughness of road are in a great measure counteracted. Portions of the projections 14 on the tire sections may be arranged to form guard fingers 30 which project from one plate and extend over the spaces between the plates and for a short distance over the adjacent plates, to prevent stones from becoming wedged between the edges of the plates. These fingers constrain the adjacent plates to move together when they overlap them, but they may be dispensed with if desired, or may me made to overlap the spaces only.

What I claim is:

1. In a traction wheel, the combination, with a wheel rim, of guide blocks secured around the rim and forming staggered guides, tire sections provided with staggered spring chambers which are slidable radially in the said guides, springs arranged in the spring chambers between the rim and the tire sections, and stop devices which limit the radial movements of the tire sections.

2. In a traction wheel, the combination, with a wheel rim, of guide blocks secured around the wheel rim and provided with socket sections and projections arranged alternately upon their side edges and in staggered relation and forming guides, tire sections provided with staggered spring chambers which are slidable radially in the said guides, springs arranged in the spring chambers between the rim and the tire sections, and stop devices which limit the radial movements of the tire sections.

3. In a traction wheel, the combination, with a wheel rim, of guide blocks secured around the wheel rim and forming staggered guides, tire sections provided with staggered spring chambers which are slidable radially in the said guides, said tire sections having also end plates which overlap the edges of the wheel rim and are provided with radial guide slots, guide pins or bolts engaging with the said guide slots and secured to the wheel rim, springs arranged in the spring chambers between the rim and the tire sections, and stop devices which limit the radial movements of the tire sections.

4. In a traction wheel, the combination, with a wheel rim, of guide blocks secured around the rim and forming staggered guides, tire sections provided with staggered spring chambers which are slidable radially in the said guides, said tire sections having also projections on their faces which engage with the ground and which form projecting guard fingers and extend crosswise of the spaces between the edges of the adjacent tire sections, springs arranged in the spring chambers between the rim and the tire sections, and stop devices which limit the radial movements of the tire sections.

In testimony whereof I have affixed my signature in the presence of two witnesses.

NEWTON SHAVER.

Witnesses:
L. Cox,
Clara Steuder.

---

Copies of this patent may be obtained for five cents each, by addressing the "Commissioner of Patents, Washington, D. C."